United States Patent [19]
van Tilburg et al.

[11] 4,172,379
[45] Oct. 30, 1979

[54] APPARATUS FOR INSPECTING A PIPELINE FOR LEAKS

[75] Inventors: Alfred van Tilburg; Robert C. Lohman, both of Amsterdam, Netherlands

[73] Assignee: Shell Oil Company, Houston, Tex.

[21] Appl. No.: 883,088

[22] Filed: Mar. 3, 1978

[30] Foreign Application Priority Data

Mar. 8, 1977 [NL] Netherlands ............... 7702461

[51] Int. Cl.² ............... G01M 3/08; G01M 3/40
[52] U.S. Cl. ............... 73/40.5 A; 325/407; 346/33 P; 346/33 F
[58] Field of Search ............... 73/40.5 A; 328/147, 328/148; 325/408, 406, 409, 407; 346/33 P, 33 F

[56] References Cited

U.S. PATENT DOCUMENTS

| 2,974,224 | 3/1961 | Ule | 325/407 |
| 3,409,897 | 11/1968 | Bosselaar | 346/33 P |
| 3,462,240 | 8/1969 | Bosselaar | 73/40.5 A |

*Primary Examiner*—S. Clement Swisher
*Assistant Examiner*—Denis E. Corr

[57] ABSTRACT

A method and apparatus for automatically adjusting the gain of an ultrasonic device for inspecting a pipeline for leaks. The ultrasonic device is designed to pass through the interior of a pipeline and record noise produced by fluids leaking from the pipeline. The response of the device is adjusted automatically by controlling the gain of the amplification in response to the strength of a signal received from an ultrasonic generator positioned outside the pipeline.

4 Claims, 1 Drawing Figure

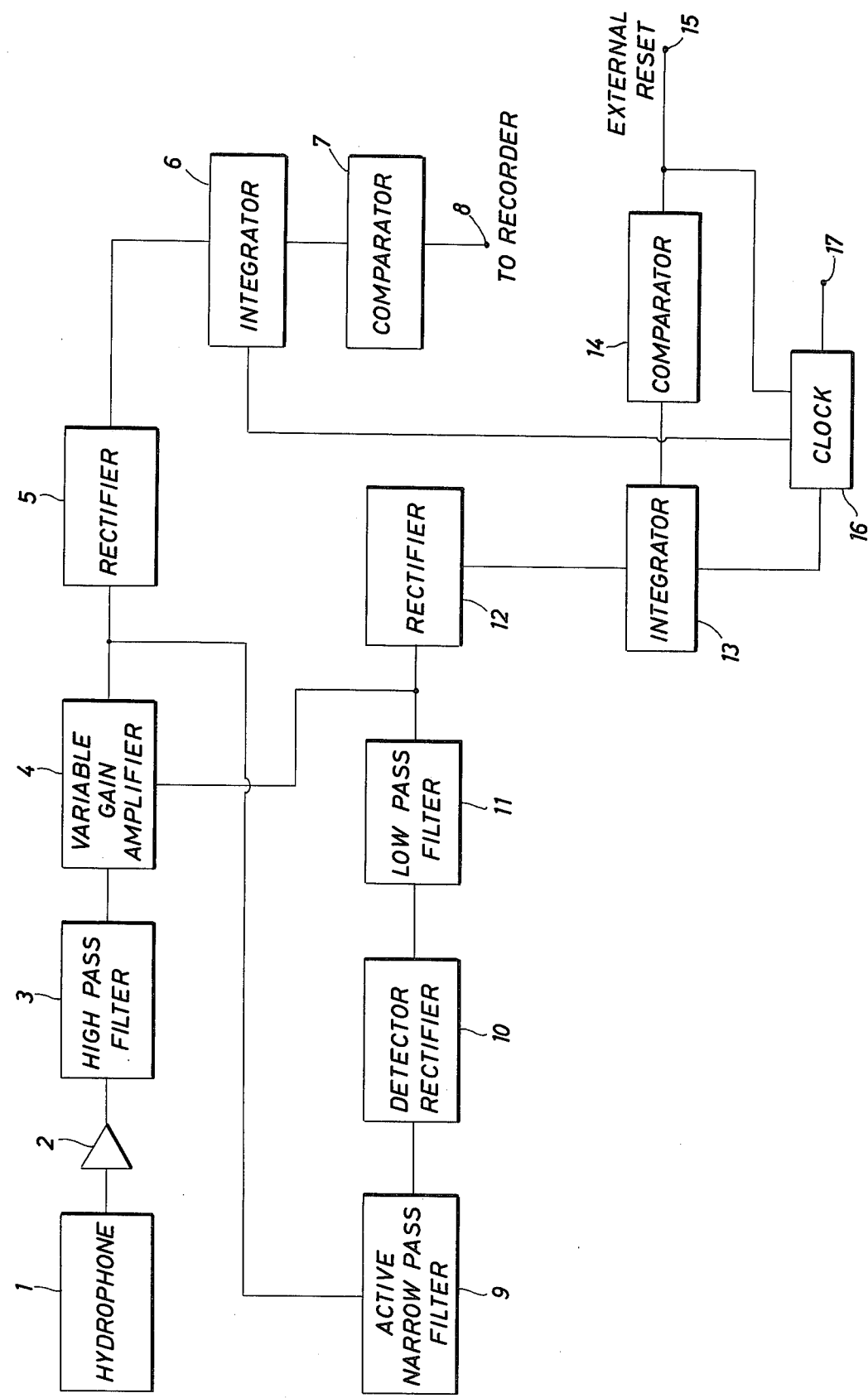

APPARATUS FOR INSPECTING A PIPELINE FOR LEAKS

RELATED PATENTS

The present invention is related to the pipeline inspection apparatus disclosed in U.S. Pat. Nos. 3,409,897 and 3,462,240.

BACKGROUND OF THE INVENTION

The invention relates to an apparatus for inspecting a pipeline for leaks particularly an apparatus is one that can be carried through the pipeline with the stream of matter flowing through that pipeline. The apparatus includes equipment for detecting, amplifying, selecting and recording acoustic signals received from leaks or external coded sources of vibration.

The outward appearance of such an apparatus may resemble a cylindrical housing with a smaller diameter than the internal diameter of the pipeline, and equipped with flanges which do not touch the inner wall of the pipeline and wheels rolling along that inner wall.

A small leak in a pipeline, in particular in a pipeline for liquids such as oil or oil products, causes a hissing sound, which is readily perceptible in the pipeline in the proximity of that leak. For this purpose the apparatus is equipped with a microphone or hydrophone attached to the outside of the cylindrical housing. The sound produced includes both audible and ultrasonic vibrations. As it travels through the pipeline the apparatus detects a rise in sound intensity when approaching a leak and a fall when the leak has been passed. The recitified signal is peak-shaped and the peak is recorded as a function of time it is possible to determine the position of the leak with the aid of the flow schedule of the pipeline. It is sufficient to print the time on the record sheet when a leak is being passed. Favorable results are obtained when the apparatus is designed for the detection and processing of vibrations in the range of 20–40 kHz.

BRIEF DESCRIPTION OF THE INVENTION

Besides establishing the presence and location of a leak, it is at least as important to be able to establish the absence of leaks. To this end there must be certainty that on its trip through the pipeline the apparatus was operating properly. For this purpose sources of vibration may be attached to the outer wall of the pipeline. Such external sources preferably give an acoustic signal within the range of the amplifier setting, for instance 35 kHz. This signal has been coded, for instance by modulation with a low-frequency vibration, so that, by filtering, it can be recognized as originating from an external source of vibration and be recorded with its own code. If the vibrations from all external sources are recorded, there is a high degree of certainty that the apparatus has been operating properly.

It has been found, however, that the observation of the signals from the external sources of vibration is not always sufficiently reliable and the invention indicates how this can be improved.

The invention therefore relates to an apparatus as described in the preamble, carrying an amplifier with variable amplification factor for the acoustic signals detected. The amplifier the input for setting the amplification factor is connected to the output of the selector for the signal from an external coded source of vibration. The amplifier output is connected with further processing and recording apparatus.

The external coded sources of vibration are acoustically coupled to the pipe wall. The intensity of the source of vibration is chosen such as to produce sufficient vibrational energy inside the pipeline for adequate detection by the passing pig. Naturally, the vibrational energy that is present inside the pipe and originates from the external source is partly determined by the acoustic coupling between the external source and the pipe wall. This coupling will vary with time because of corrosion, mechanical forces and changes in the geometry of the pipe. As a consequence, the intensity of the acoustic signal in the pipeline may vary in an unpredictable and highly irregular way. With the apparatus according to the invention the amplification factor of the amplifier is adapted to the intensity of the signal from an external source of vibration in the pipeline at the moment of detection. Obviously, the amplification factor increases as that intensity decreases.

The intensity of the external source of vibration will be chosen high, i.e., so high that in the case of optimum coupling the intensity in the pipeline will be too high. The adverse effect of too high an intensity is to overload of the amplifiers, which may lead to erroneous recordings. Moreover, at too high an intensity the number of recordings obtained is unnecessarily large. This is compensated for by a decrease of the amplification factor. As the coupling deteriorates, a strong external source can be used longer than a weak source. The ratio of the maximum to the minimum amplification factor may be 50 dB. When the apparatus is not in the proximity of an external source, the selector for the signal from an external source does not give a signal. The amplification factor is then automatically at its maximum. This means that the signal from a leak is always processed with a maximum amplification factor. This is a favorable circumstance, since the leak signal may be weak. Weak and strong leak signals can be distinguished on the record sheet by the number of prints made, and this indication is desired.

BRIEF DESCRIPTION OF THE DRAWINGS

The invention will now be described with reference to the attached drawing showing a block diagram of part of an apparatus according to the invention for the detection, amplification and selection of the acoustic signals.

PREFERRED EMBODIMENT

Hydrophone 1 is connected to pre-amplifier 2 with a high input impedance. This amplifier has a constant amplification factor of about 3 dB. Its output is connected to an active filter element 3 having a frequency range is 20–40 kHz, and constant amplification factor about 17 dB. Its output is connected to an amplifier 4 with variable amplification factor have a maximum amplification of 50 dB. The amplification factor is set automatically by the output signal from a filter element 11 to be discussed hereinafter. The output of amplifier 4 is connected to a rectifier 5. The rectifier output signal goes to an integrator 6, where the signal is integrated for about two seconds. If the output signal exceeds a certain set value, comparator 7 changes its output signal which goes via connection 8 to the recording unit not further represented here.

The output of amplifier 4 is also connected to the input of an active filter element 9. This element is tuned in to the frequency of the external coded sources of vibration, for instance 35 kHz and has a constant amplification factor of about 4 dB. The signal from this filter element goes to a detector 10 where the high-frequency signal is rectified. The rectified signal goes to a low-frequency filter 11, tuned in to the modulation of the external sources of vibration, which functions as code of the signals from these sources. This low frequency may for instance be 72 Hz. The constant amplification factor is about 15 dB. If a signal passes through this filter element 11, the signal received by hydrophone 1 came from an external coded source of vibration. Thus, double filtering takes place, so that any low-frequency signal that happens to be present in the pipeline and includes 72 Hz cannot interfere.

The output of low-frequency filter 11 is connected with the input for setting the amplification factor of amplifier 4. A weak signal from filter 11 will lead to a high amplification factor of amplifier 4 and conversely. The output of filter 11 is also connected with rectifier 12, which is followed by an integrator 13, a comparator 14 and a connection 15. They have the same function for the signal from an external source as the chain 5, 6, 7 and 8 for a leak signal. The two integrators 6 and 13 are set in the initial position every two seconds by clock-pulse generator 16. This can be done from outside via connection 17. If desired, the pulse of the clock is delayed by the signal to connection 15 for the time required by integrator 6 to give a signal to connection 8.

What is claimed is:

1. An improved apparatus for inspecting a pipeline for leaks, said apparatus being adapted to be transported through the pipeline by fluid flow to detect, amplify and record ultrasonic vibrations caused by fluid leaking from the pipeline, the improvements comprising:

an amplifier, said amplifier having a variable gain;

circuit means disposed on the apparatus to receive and detect a frequency modulated coded acoustical signal, said coded acoustical signal being supplied from an external source acoustically coupled to said pipeline; and additional circuit means coupled to said circuit means and responsive to the amplitude of said coded acoustic signal to adjust the gain of said amplifier.

2. The apparatus of claim 1 wherein said amplifier has a variable gain of at least 50 dB.

3. The apparatus of claim 1 wherein said circuit means comprises a filter disposed to pass the carrier frequency of the coded signal, a detector-rectifying circuit disposed to detect the code signal in the signal passed by the filter and a second filter disposed to pass the frequency of the code signal.

4. The apparatus of claim 3 and in addition said carrier frequency being in the ultrasonic range and said code signal being in the sonic range.

* * * * *